United States Patent
Plog et al.

[11] Patent Number: 6,015,483
[45] Date of Patent: Jan. 18, 2000

[54] PROCESS FOR THE NO-REMOVAL FROM ENGINE EXHAUST GASES

[75] Inventors: Carsten Plog, Markdorf; Renato Andorf, Meckenbeuren; Ralf Mueller, Aulendorf; Wolfgang Schaefer, Friedrichshafen; Armin Kayser, Meersburg, all of Germany

[73] Assignee: DORNIER GmbH, Germany

[21] Appl. No.: 09/053,517

[22] Filed: Apr. 2, 1998

[30] Foreign Application Priority Data

Apr. 2, 1997 [DE] Germany ............... 197 13 633

[51] Int. Cl.$^7$ ........................................ C25B 1/00
[52] U.S. Cl. ............ 205/763; 205/765; 205/781; 204/265; 204/266; 204/277; 204/278; 204/424; 204/426
[58] Field of Search ................... 205/763, 765, 205/781; 204/265, 266, 277, 278, 424, 426

[56] References Cited

U.S. PATENT DOCUMENTS

| | | |
|---|---|---|
| 3,950,944 | 4/1976 | Shidahara et al. . |
| 4,738,760 | 4/1995 | Baker et al. . |
| 5,409,591 | 4/1995 | Baker et al. ............... 204/425 |
| 5,658,449 | 8/1997 | Benz et al. ............... 205/637 |

FOREIGN PATENT DOCUMENTS

| | | |
|---|---|---|
| 0 566 071 A1 | 10/1993 | European Pat. Off. . |
| WO 94/25642 | 11/1994 | European Pat. Off. . |
| 36 44 090 A1 | 7/1988 | Germany . |
| 19527693 | 7/1995 | Germany . |
| 195 27 693 C1 | 10/1996 | Germany . |

Primary Examiner—Arun S. Phasge
Attorney, Agent, or Firm—Evenson, McKeown, Edwards & Lenahan, P.L.L.C.

[57] ABSTRACT

A process for removing NO from exhaust in which NO-containing exhaust is guided to a first electrode on which the NO is anodically oxidized to $NO^+$, the $NO^+$ is subsequently transported through an $NO^+$-conducting solid electrolyte to a second electrode on which the NO is cathodically reduced.

14 Claims, 8 Drawing Sheets

PROCESS FOR THE NO-REMOVAL FROM ENGINE EXHAUST GASES

BACKGROUND AND SUMMARY OF THE INVENTION

This application claims the priority of German Patent 197 13 633.8, filed Apr. 2, 1997, the disclosure of which is expressly incorporated by reference herein.

The invention relates to a process for removing NO from the exhaust gas of internal-combustion engines, particularly for use in a motor vehicle.

Increasingly strict emissions laws require development of more efficient exhaust gas aftertreatment systems for motor vehicles. For meeting future laws, several avenues are being explored for removing nitrogen from lean engine exhaust gases:

DENOX ($NO_x$-removal) Catalysis

Using a reducing agent, such as ammonia or a hydrocarbon, nitrogen oxides are converted on a suitable catalyst to nitrogen and water. When a hydrocarbon is used, carbon dioxide is also produced. DENOX-catalysts developed so far have too little activity and are not selective enough. Also, for the most part, long-term stability of the catalyst in the exhaust gas is limited.

$NO_x$-Storage Catalysts

This catalyst consists of two components. A $NO_x$-storing material and a three-way catalyst comprise this aftertreatment system. In lean operation of an engine, nitrogen oxides are chemically bound as nitrate in the storage component. They are released in a regeneration phase under stoichiometric or rich engine operating phases and converted on the three-way catalyst to nitrogen. The $NO_x$-storing material is susceptible to $SO_x$ degradation and has limited thermal stability. These factors currently prevent use of this type of catalyst in mass-produced vehicles.

SNR-Process (Selective $NO_x$-Return)

Nitrogen oxides are stored on a suitable material in the exhaust gas. After a complete charging of the $NO_x$ storage device they are returned by way of a corresponding flap control in the exhaust routing via the intake air into the engine combustion chamber where reduction takes place during combustion. So far, an insufficient storage device charging capacity and limited life have prevented use of an SNR-process in mass-produced vehicles.

All of the above processes are still in the development stage and cannot be used in series-produced vehicles.

It is therefore an object of the invention to provide a process for NO-removal from engine exhaust gases without the above disadvantages, particularly lack of activity, lack of selectivity and lack of long-term stability.

This object is achieved by conducting NO-containing exhaust to a first electrode where NO is anodically oxidized to $NO^+$, transporting $NO^+$ through a solid electrolyte, and then cathodically reducing the $NO^+$ to NO.

According to the invention, an $NO^+$-conducting electrochemical solid electrolyte is used. The electrolyte is arranged between two electrodes and withdraws NO from exhaust and transports the NO into an enrichment cell when a voltage is applied. NO on the exhaust gas side is anodically oxidized to $NO^+$ and transported through the solid electrolyte. On the cathode, the nitrogen oxide cations are reduced to NO.

A cation-conducting solid is generally used as the solid electrolyte. $NO^+$- or $Ag^+$-exchanged beta aluminum oxide are mentioned as embodiments.

In contrast to known processes, the process of the invention has the advantage that nitrogen oxides can be removed from exhaust gas without using additional reducing agents.

The process according to the invention can be used for meeting future laws for removal of $NO_x$ from exhaust gases. It can be used particularly for removing nitrogen oxides in the exhaust gas of $\lambda$=1-operated or lean-mixture operated motor vehicles.

By means of nitrogen oxides enriched on the cathode side, different processes can be carried out after the selective removal of $NO_x$. Some of these are briefly described below:

Case A

Figure 2:
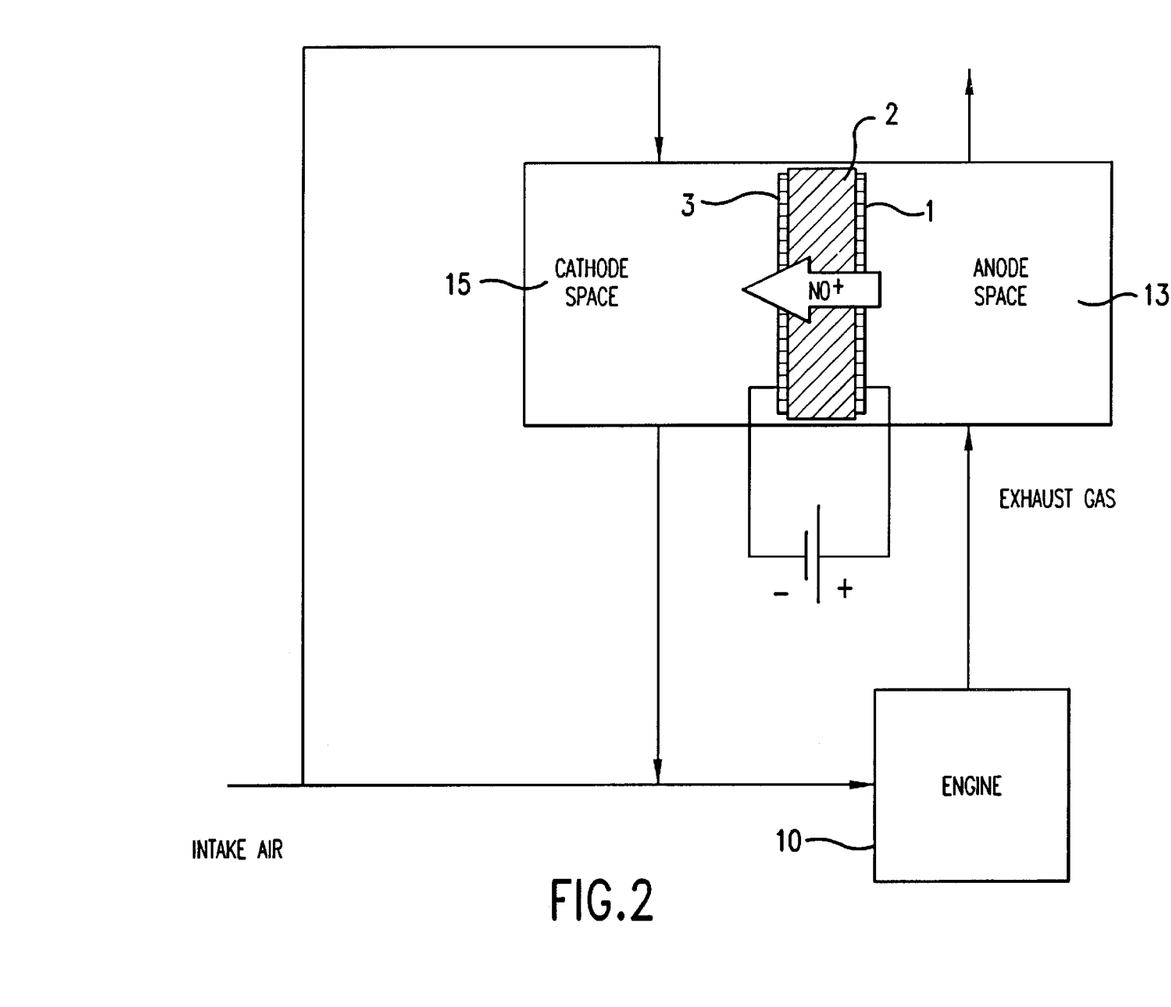
FIG. 2 is a view of the process according to Case A discussed above.

Return of NO by way of intake air into the engine combustion chamber (according to the SNR-principle) (FIG. 2).

Case B

Figure 3:
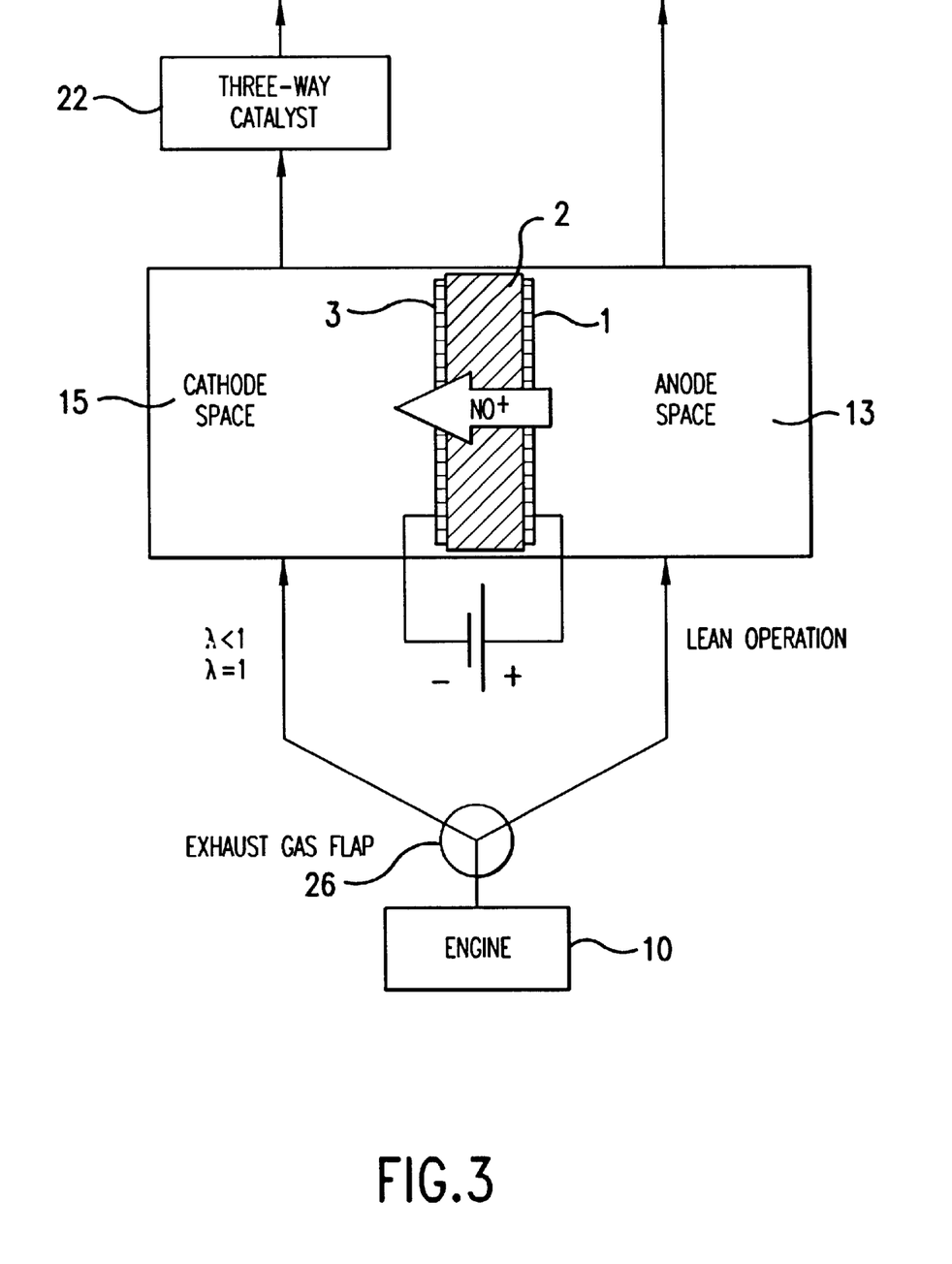
FIG. 3 is a view of the process according to Case B discussed above.

Conversion of NO under stoichiometric/rich exhaust gas conditions for lean-mix operated Otto engines (direct injection or intake pipe injection) (FIG. 3).

Case C

Figure 4:
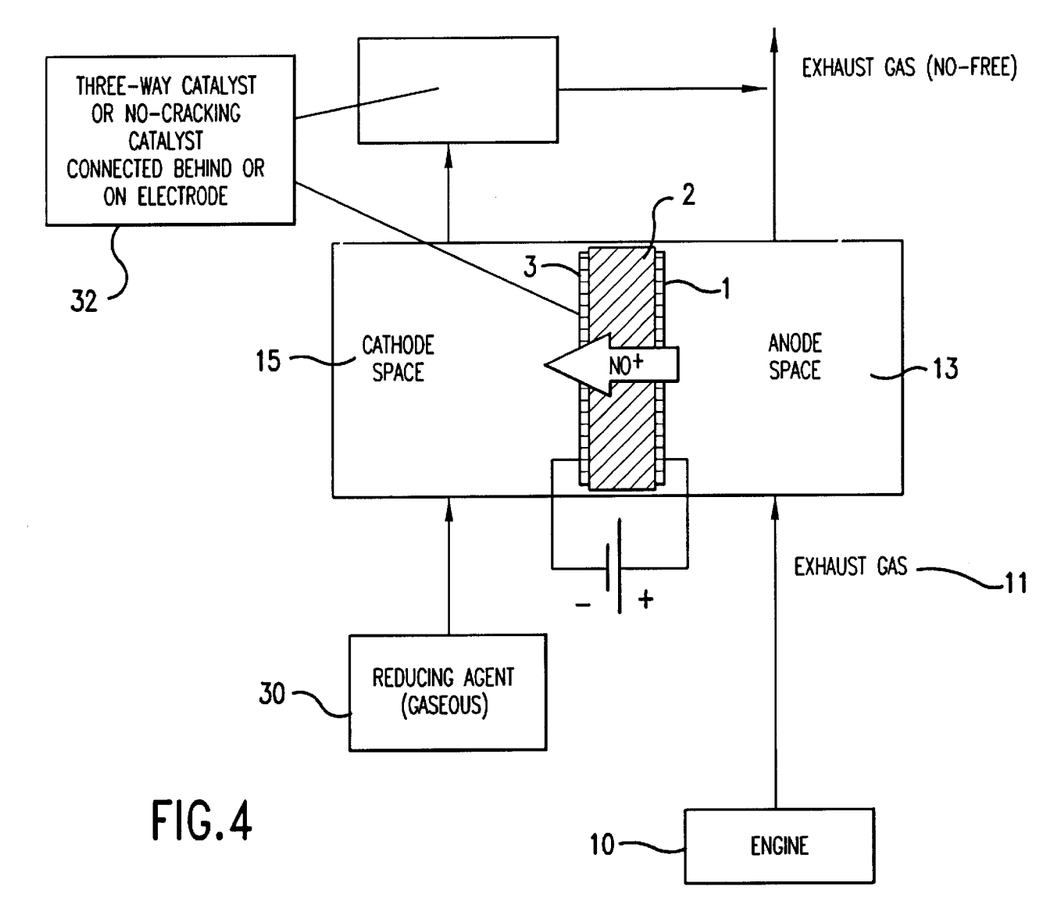
FIG. 4 is a view of the process according to Case C discussed above.

Conversion of NO by gaseous reducing agents (such as hydrocarbon, CO, H2) generated or carried along on board the motor vehicle (FIG. 4).

Case D

Figure 5:
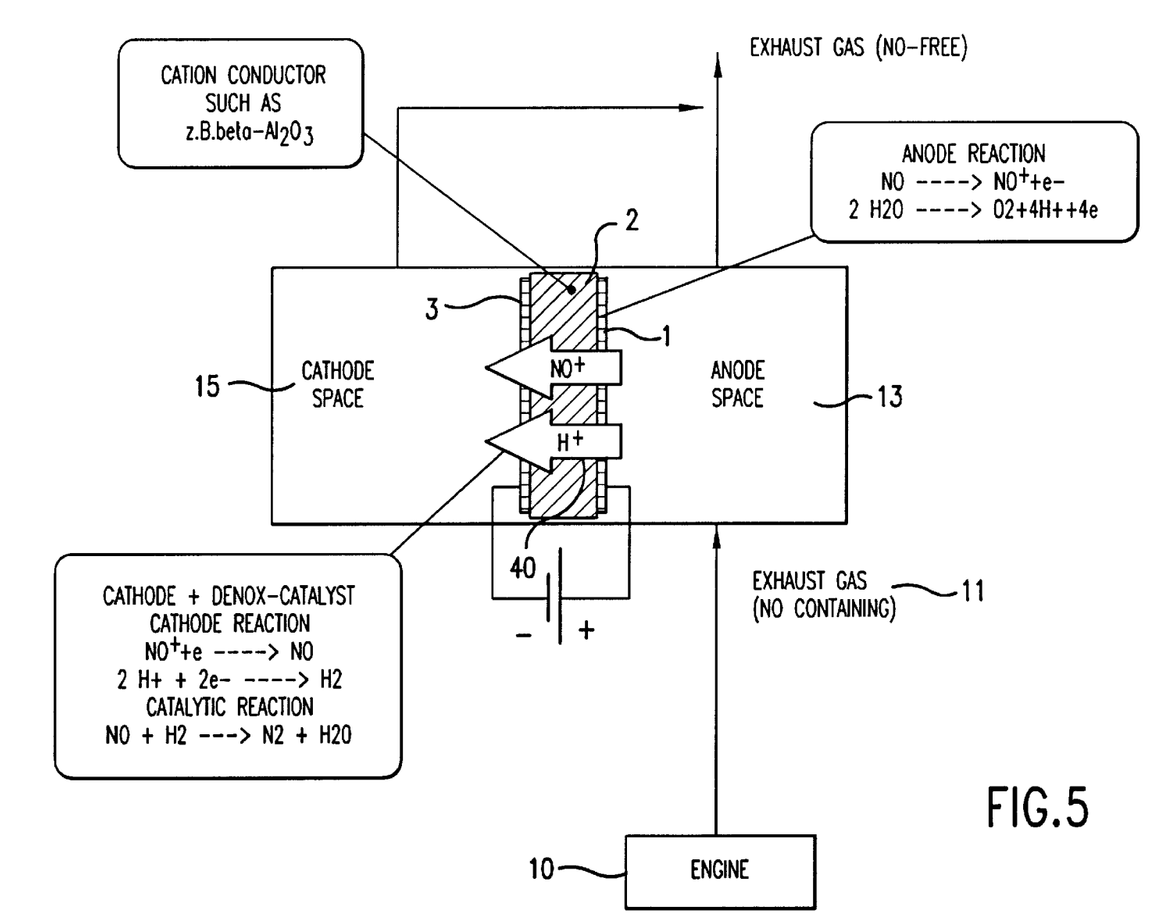
FIG. 5 is a view of the process according to Case D discussed above.

Catalytic reduction of NO by $H_2$ as $H^+$ produced from exhaust gas water transported through the solid electrolyte as $H^+$ or through an additional $H^+$-conducting membrane (for example, a PEM Proton Exchange Membrane) (FIG. 5).

Case E

Figure 6:
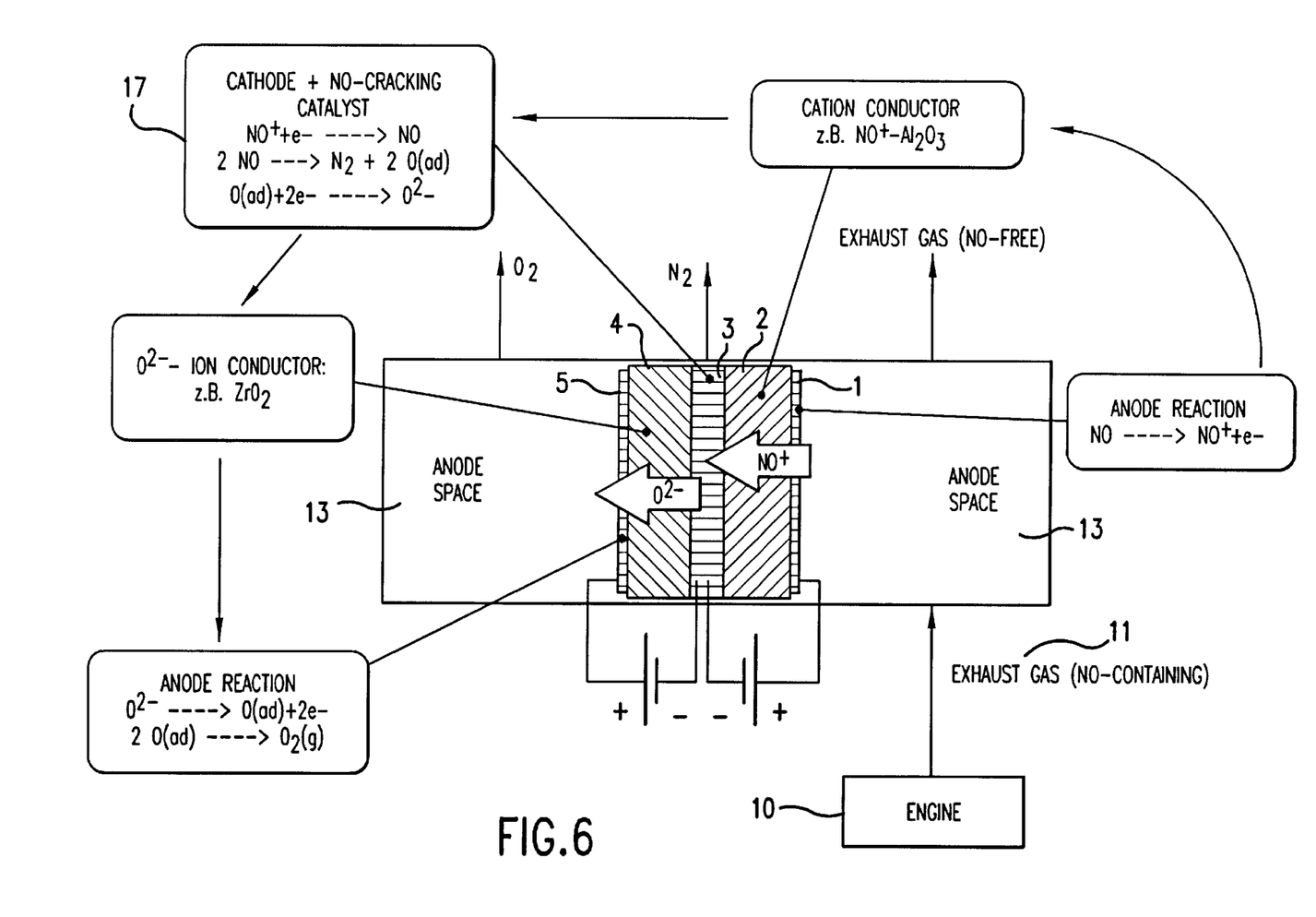
FIG. 6 is a view of the process according to Case E discussed above.

Cracking of NO on the cathode side on a catalyst while releasing $N_2$ (gaseous) and transporting cracked oxygen through an $O^{2-}$-ion conductor which is known (FIG. 6).

Other objects, advantages and novel features of the present invention will become apparent from the following detailed description of the invention when considered in conjunction with the accompanying drawings.

DETAILED DESCRIPTION OF THE DRAWINGS

Figure 1:
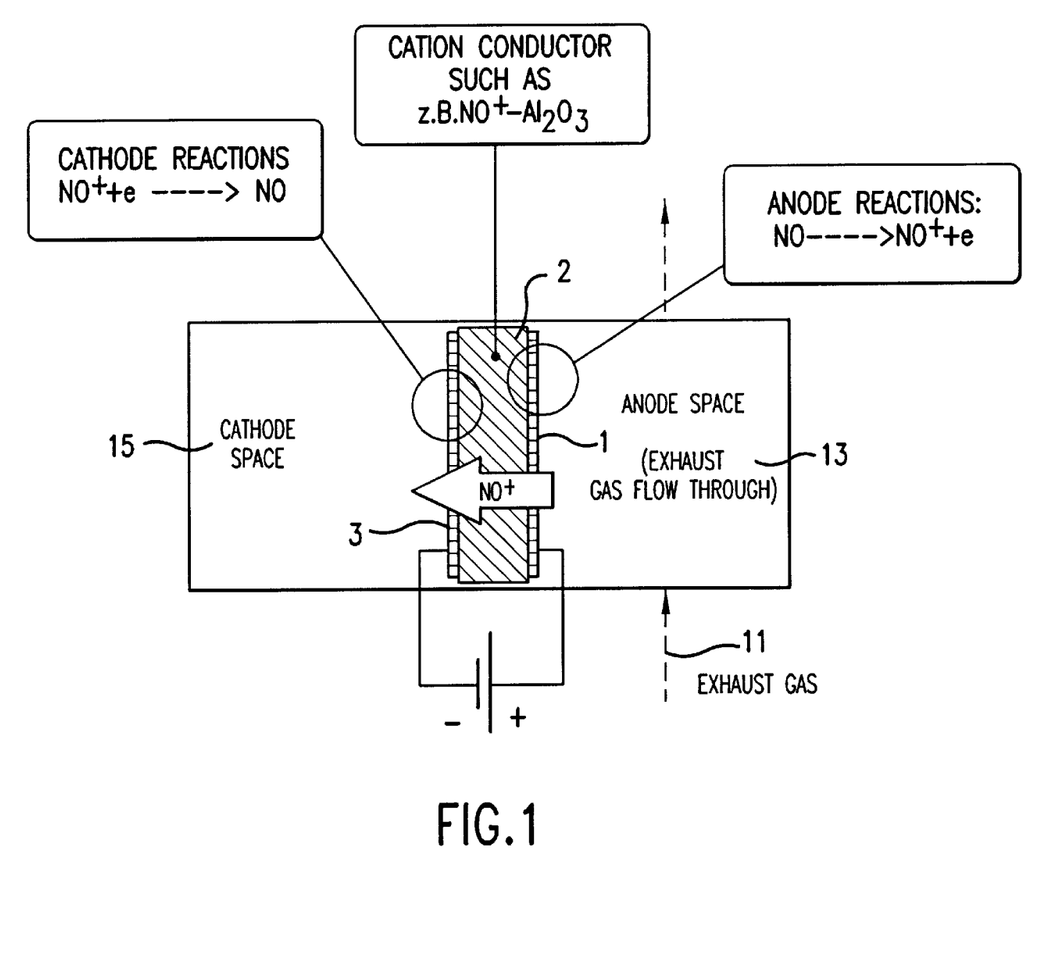
FIG. 1 is a basic diagram showing the sequence of the process according to the invention.

FIG. 1 illustrates the operating principle of the process according to the invention. Two electrodes are shown (anode 1, cathode 3), between which, by means of an external voltage source, a defined voltage difference is maintained. The cation-conducting solid electrolyte 2 between the two electrodes 1, 3 is also shown. An NO$^+$-exchanged beta aluminum oxide is used as the solid electrolyte 2 as an example. The exhaust gas of the internal-combustion engine 10 flows through the anode space 13. On the anode 1, the NO is oxidized to NO$^+$ according to the reaction $$NO \rightarrow NO^+ + e^-.$$

The NO$^+$-ions are transported through the solid electrolyte 2 and, on the cathode 3, are reduced to NO according to the reaction $$NO^+ + e^- \rightarrow NO.$$

FIGS. 2 to 6 show in detail how the process can be carried out by nitrogen oxides enriched on the cathode side.

FIG. 2 shows a first process variant (Case A) in which NO present on the cathode side is returned by way of intake air into the engine combustion chamber 10. Analogous to the abovementioned SNR-process, the reduction of NO will then take place in the engine combustion chamber 10 during combustion. In the SNR-process, no NO-storing material is known which has sufficient long-term stability in exhaust gas. The described process can completely replace NO-enrichment by means of an NO-adsorbent. Another advantage is that the process can operate continuously. In contrast, the SNR-process based on NO-adsorption must be carried out cyclically because there are two different phases, an adsorption phase and a desorption phase.

FIG. 3 shows case B in which NO present on the cathode side is converted under stoichiometric or rich exhaust gas conditions in the case of lean-mixture-operated Otto engines (direct injection or intake pipe injection). Exhaust gas 11 flow is controlled by way of an exhaust gas flap 20. In the case of a lean-operated engine, the engine exhaust gases are guided into the anode space 13 where, according to the invention, NO is oxidized to NO$^+$. During a stoichiometric ($\lambda=1$) operation or a rich ($\lambda<1$) operation, exhaust gas is guided through the cathode space 15 enriched with NO and is further guided to a three-way catalyst 22 as is known.

NO$_x$ storage catalysts are being developed for use in lean-mixture-operated Otto engines. Because they are easily destroyed by SO$_x$ and high temperatures, special problems are posed. As a result of the present invention, storage catalysts can be eliminated.

In FIG. 4, NO present on the cathode side is converted on a catalyst using a reducing agent 30 (Case C). The gaseous reducing agent 30, such as hydrocarbons, CO or H$_2$, is introduced into the cathode space 15. A three-way catalyst 32 or an NO-cracking catalyst 32 can be used as the catalyst. The catalyst may be arranged on the cathode 3 or may be connected behind the cathode space 15. The reducing agent 30 can be generated on board the motor vehicle or carried along in a tank.

The reduction of NO on the cathode side by a gaseous reducing agent 30 can be carried out in the absence of oxygen in a highly selective manner. As a result, higher NO-conversions are achieved while the reducing agent requirement is simultaneously decreased.

FIG. 5 shows Case D as a further embodiment of the invention. NO present on the cathode side is converted by the catalytic reduction by H$_2$. The solid electrolyte 2, such as beta Al$_2$O$_3$, in addition to transporting the NO$^+$, can also transport H$^+$-ions. The cathode 3 is coated with a DENOX- (NO$_x$-removal) catalyst which is known per se. In the case of the illustrated construction, in addition to the NO$^+$-ions, H$^+$-ions also pass through the solid electrolyte 2. The H$^+$-ions originate from water existing in engine exhaust gas according to the reaction:

$$2H_2O \rightarrow O_2 + 4H^+ + 4e^-.$$

The H$^+$-ions are reduced to H$_2$ on the cathode according to the reaction $$2H^+ + 2e^- \rightarrow H_2.$$

The following reaction takes place on the DENOX-catalyst on the cathode 3:

$$NO + H_2 \rightarrow N_2 + H_2O.$$

In addition to the described embodiment, in the case of which NO$^-$ as well as H$^+$-ions are transported through the solid electrolyte 2, an alternative arrangement is also possible in which, in addition to an NO$^+$ conducting solid electrolyte, another, H$^+$-ion-conducting solid electrolyte is present, such as a PEM 40 (Proton Exchange Membrane).

As above, the reduction of NO with hydrogen simultaneously generated on the cathode can be carried out highly selectively in the absence of oxygen. Hydrogen, quite advantageously, can be generated on board. Hydrogen has a high reducing potential.

FIG. 6 shows an embodiment (Case E) in which NO present on the cathode side is catalytically reduced to N$_2$ and O$^{2-}$. The O$^{2-}$-ions are subsequently transported through an O$^{2-}$ conducting solid electrolyte 4. As in the preceding embodiments, the anode 1, an NO$^+$-ion-conducting solid electrolyte 2, such as NO$^+$-exchanged Al$_2$O$_3$, as well as a cathode 3 are present. The cathode 3 is coated with an NO-cracking catalyst 17, on which the cathode-side NO is cracked according to the reaction $$2NO \rightarrow N_2 + 2O(ad)$$

$$O(ad) + 2e^+ \rightarrow O^{2-} \text{ with (ad): adsorbed}$$

In addition, another anodically switched electrode 5 is provided, a voltage difference existing between this additional electrode 5 and the cathode 3. Between the electrode 3 and the additional electrode 5, an O$^{2-}$-conducting solid electrolyte 4, such as zirconium dioxide, is arranged. The cracked oxygen O$^{2-}$ formed on the cathode 3 is transported through the O$^{2-}$-conducting solid electrolyte 4 to the additional electrode 5. There, it is discharged and delivered as O$_2$-molecules:

$$O^{2-} \rightarrow O(ad) + 2e^-$$

$$2O(ad) \rightarrow O_2(g) \text{ with (g): gaseous (ad): adsorbed}$$

For this described process variation, a reducing agent is not necessary. Electric energy is applied selectively only for transporting NO through the electrolyte.

Figure 7:
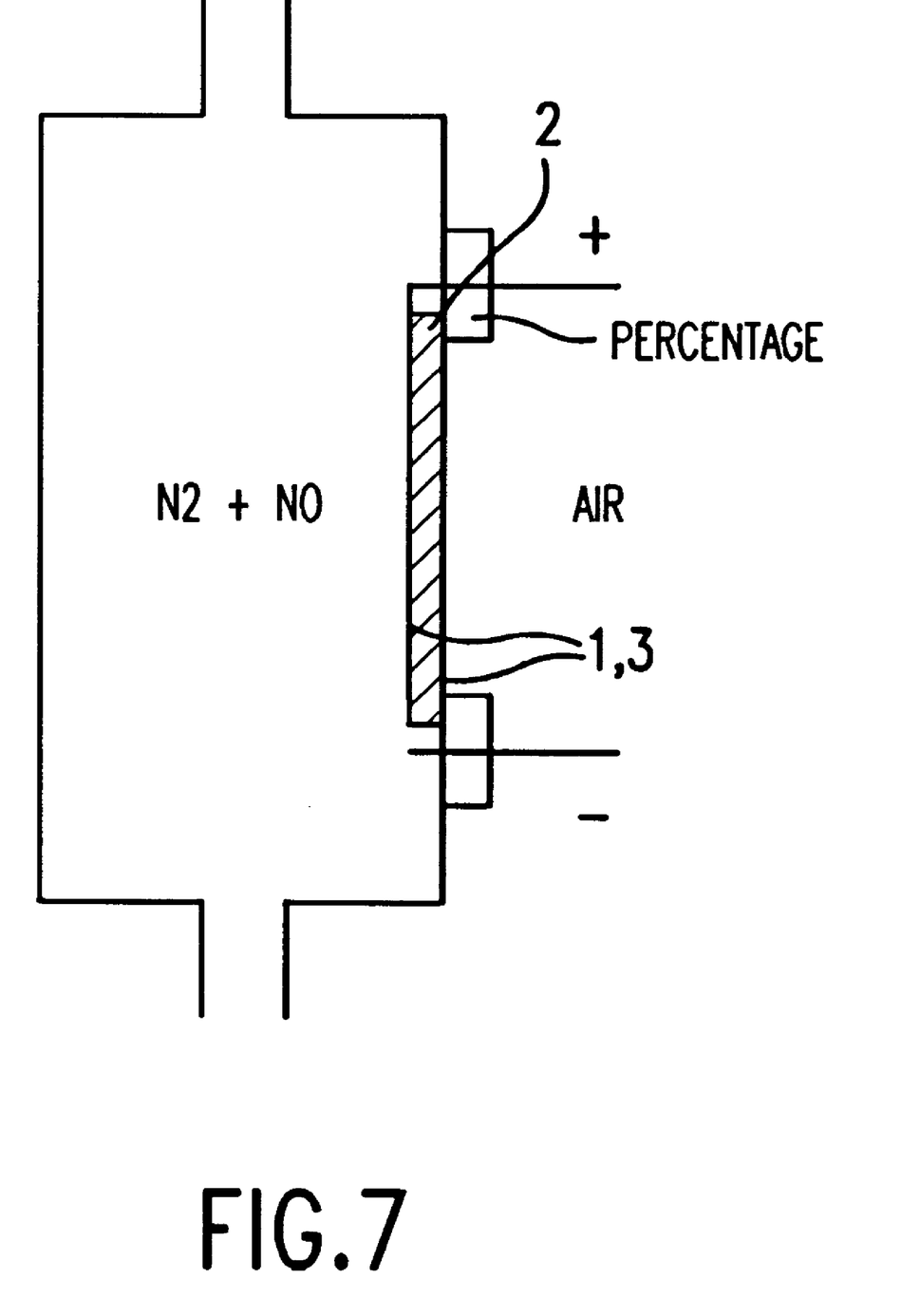
FIG. 7 is a view of an experimental setup for implementing the process according to the invention.

FIG. 7 shows an experimental setup for carrying out the process according to the invention. A voltage which is raised slowly is applied by way of two Pt/soot electrodes 1, 3 to an Ag$^+$-exchanged beta Al$_2$O$_3$-membrane 2 (solid electrolyte) which is subjected on one side to NO-containing gas. A current is present which increases with the voltage. When NO-containing gas is switched off, current will diminish despite a constant voltage. Current flow is therefore the result of conversion of NO.

Figure 8:
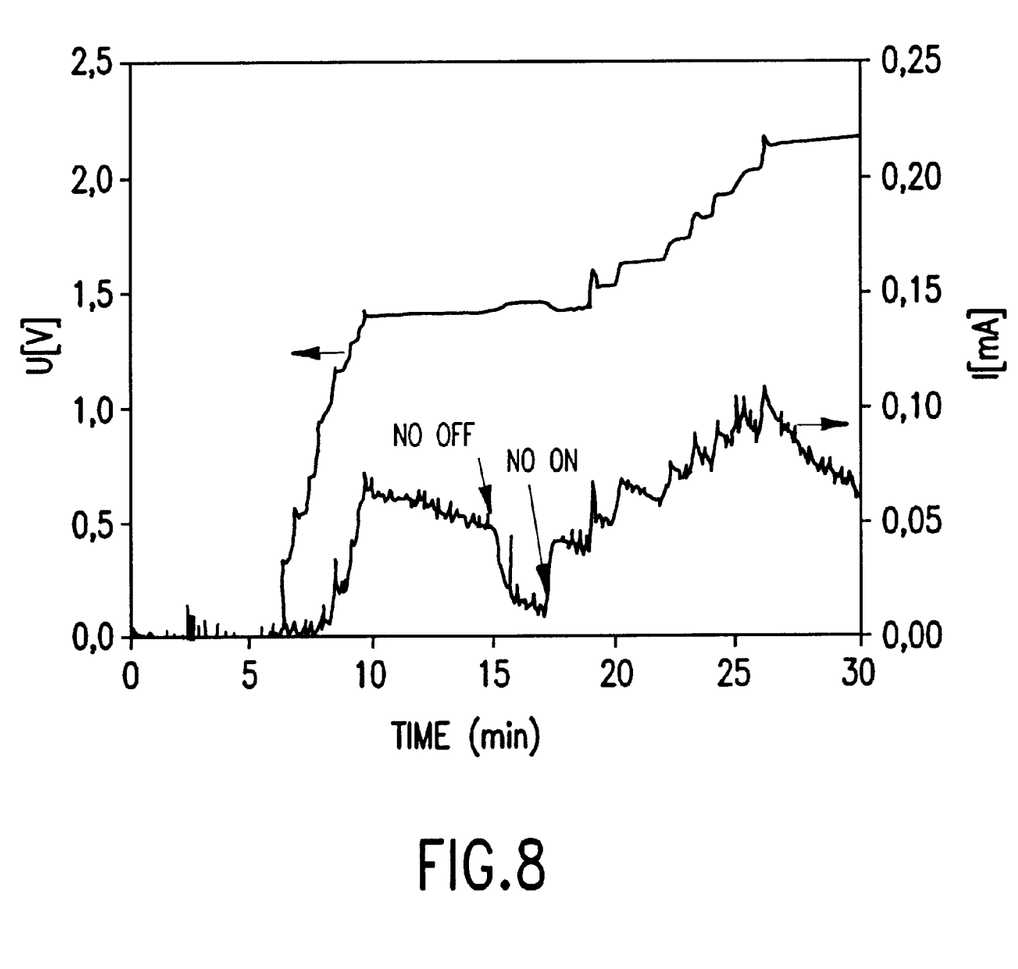
FIG. 8 is a view of the voltage U (left, in volts,) and the current intensity (right, in mA) over time (in minutes), measured on an experimental setup according to FIG. 7.

FIG. 8 shows the corresponding time sequences of the voltage and the current intensity.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A process for removing NO from exhaust gas, the process comprising the steps of:

conducting NO-containing exhaust gas to a first electrode, on which NO is anodically oxidized to $NO^+$;

transporting the $NO^+$ through an $NO^+$-conducting solid electrolyte which adjoins the first electrode to a second electrode;

cathodically reducing the $NO^+$ on the second electrode 3 to NO; and reducing the NO present on a side of the second electrode.

2. The process according to claim 1, wherein said reducing the NO comprises the steps of guiding the NO present on a side of the second electrode into an engine combustion chamber by way of intake air.

3. The process according to claim 1, wherein said reducing the NO comprises the steps of reacting the NO on a three-way catalyst on a side of the second electrode under stoichiometric or rich exhaust conditions.

4. The process according to claim 1, wherein said reducing the NO comprises catalytically converting the NO using a gaseous reducing agent.

5. The process according to claim 1, wherein said reducing the NO comprises catalytically reducing the NO with $H_2$ as a reducing agent originating from exhaust-gas water and being transported through the solid electrolyte or being transported through an additional $H^+$-conducting membrane to the side of the second electrode.

6. The process according to claim 1, wherein said reducing the NO comprises catalytically reducing the NO to $N_2$ and $O^{2-}$; and subsequently transporting the $O^{2-}$ through an $O^{2-}$-conducting solid electrolyte which adjoins the second electrode.

7. The process according to claim 1, further comprising using an $Ag^+$-exchanged or $NO^+$-exchanged beta or beta" aluminum oxide as the solid electrolyte.

8. An apparatus for removing NO from exhaust gas comprising:

(a) a first electrode being an anode where NO is oxidized to $NO^+$;

(b) a $NO^+$ conducting solid electrolyte adjoining said first electrode; and (c) a second electrode being a cathode adjoining said $NO^+$ conducting solid where $NO^+$ is reduced to NO; and (d) a catalyst.

9. The apparatus according to claim 8 wherein said catalyst is a three-way catalyst located on a side of the second electrode wherein NO is reacted on the three-way catalyst under stoichiometric or rich exhaust conditions.

10. The apparatus according to claim 8 further comprising a gaseous reducing agent for reducing the NO on the second electrode, the catalyst being associated with the second electrode.

11. The apparatus according to claim 8 further comprising diatomic hydrogen produced from exhaust gas water, wherein said diatomic hydrogen may be ionized and transported through said solid electrolyte, wherein the catalyst is associated with the second electrode.

12. The apparatus of claim 8, further comprising an $O^2$-conducting solid electrolyte which adjoins the second electrode.

13. The process according to claim 8 wherein the electrolyte is $AG^+$-exchanged or $NO^+$-exchanged beta- aluminum oxide.

14. An apparatus for removing NO from exhaust gas comprising:

(a) a first electrode being an anode where NO is oxidized to $NO^+$;

(b) a $NO^+$ conducting solid electrolyte adjoining said first electrode; and (c) a second electrode being a cathode adjoining said $NO^+$ conducting solid where $NO^+$ is reduced to NO; and (d) an engine combustion chamber connected to the second electrode wherein the NO is reduced.

* * * * *